(12) United States Patent
Lindamood

(10) Patent No.: US 6,772,883 B2
(45) Date of Patent: Aug. 10, 2004

(54) POP-UP ELECTRONIC EQUIPMENT ENCLOSURE

(76) Inventor: Kirk Lindamood, 1578 Noyes Rd., Arroyo Grande, CA (US) 93420

( * ) Notice: Subject to any disclaimer, the term of this patent is extended or adjusted under 35 U.S.C. 154(b) by 0 days.

(21) Appl. No.: 10/391,860

(22) Filed: Mar. 18, 2003

(65) Prior Publication Data

US 2003/0178332 A1 Sep. 25, 2003

Related U.S. Application Data

(63) Continuation-in-part of application No. 09/876,456, filed on Jun. 6, 2001, now abandoned, and a continuation-in-part of application No. PCT/US02/16916, filed on May 30, 2002.

(51) Int. Cl.⁷ ............................................. B65D 85/00
(52) U.S. Cl. ........................ 206/320; 206/576; 383/907; 150/165; 190/107
(58) Field of Search ................................. 206/320, 576, 206/701, 720, 721, 305; 150/154, 165; 190/107, 903; 383/907

(56) References Cited

U.S. PATENT DOCUMENTS

| | | | |
|---|---|---|---|
| 1,411,272 A | | 4/1922 | Eaton |
| 2,509,537 A | | 5/1950 | Stier |
| 3,038,513 A | | 6/1962 | Hamlett |
| 3,554,257 A | * | 1/1971 | Glantz et al. .......... 206/315.91 |
| 4,003,508 A | | 1/1977 | Hoops |
| 4,665,935 A | | 5/1987 | Nichols |
| 5,078,096 A | | 1/1992 | Bishop |
| 5,273,142 A | | 12/1993 | Weber |
| 5,311,813 A | | 5/1994 | Fairbanks |
| 5,325,970 A | * | 7/1994 | Dillon et al. ............... 206/576 |
| 5,400,903 A | | 3/1995 | Cooley |
| 5,439,018 A | | 8/1995 | Tsai |
| 5,515,564 A | | 5/1996 | Lyons |
| D372,953 S | | 8/1996 | Florez |
| 5,778,915 A | | 7/1998 | Zheng |
| 5,988,823 A | | 11/1999 | Wong |
| 6,014,982 A | | 1/2000 | Strevey |
| D420,414 S | | 2/2000 | Lah |
| 6,149,001 A | | 11/2000 | Adkins |
| 6,263,617 B1 | * | 7/2001 | Turcot et al. ................ 52/2.18 |
| 6,273,368 B1 | | 8/2001 | Zheng |
| 6,390,345 B1 | | 5/2002 | Brown |

OTHER PUBLICATIONS

Internet Site http://www.outdoorreview.com/Backpacking-Camping-Hiking/Tents/Mountain+Hardwear+Alpine+Cook+Tent/PRD_79712_2955crx.aspx Aug. 28, 2001.
Internet Site http://www.hoodmanusa.com/E2000.htm Aug. 28, 2001.
Internet Sites http://www.primesuccess.com.hk/toys.htm http://www.primesuccess.com.hk/toys1.htm Aug. 28, 2001.
Internet Site http://www.privateeyecases.com Aug. 28, 2001.

* cited by examiner

Primary Examiner—Jila M. Mohandesi
(74) Attorney, Agent, or Firm—William Keyworth; Bill & Mary Lou Inc.

(57) ABSTRACT

A collapsible electronic equipment enclosure surrounds portable or tabletop electronic equipment, such as laptop computers, with opaque protective sheeting supported by flexible struts. An opening is provided that may include a transparent window and provision for hand entry to permit use of the contained equipment while it is protected from environmental hazards. Provision is made for equipment display visibility in bright sunshine and lighting. Restricting visibility of the equipment display enhances privacy. The enclosure collapses to store in a narrow space, is lightweight, and can be used to transport the contained equipment either by a carry handle or as a backpack. The enclosure can be anchored to a tabletop for motion protection. It can also be locked closed and the contained equipment fastened by a security cable and lock to provide theft and tamper protection for the contained equipment and the enclosure when unattended.

22 Claims, 6 Drawing Sheets

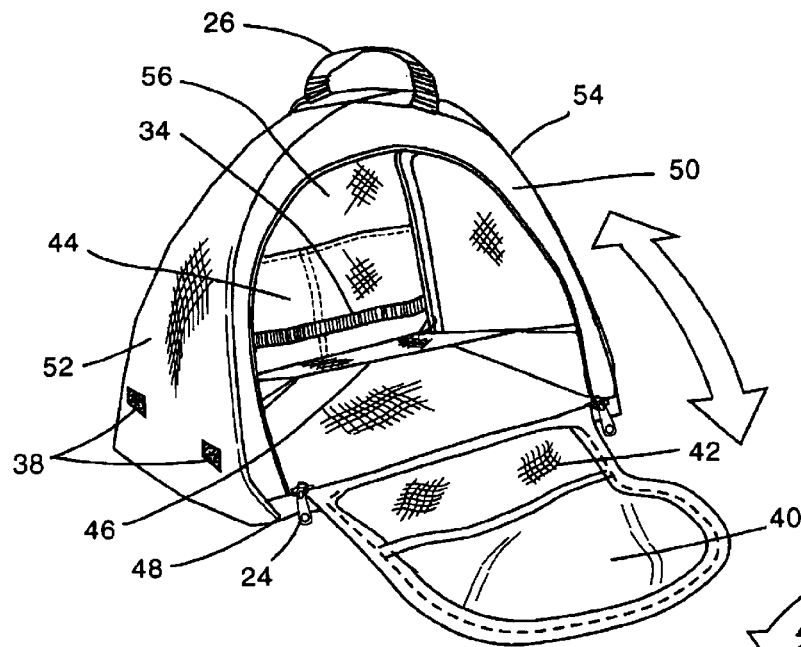
Fig.1
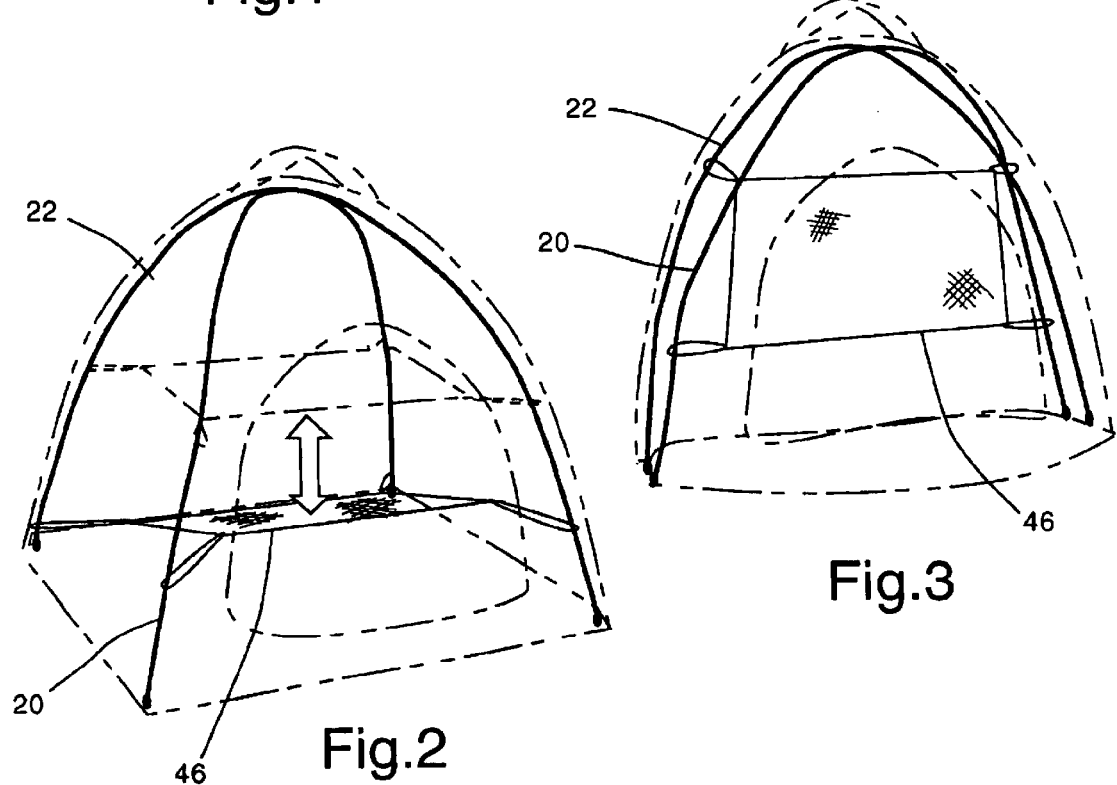
Fig.2
Fig.3

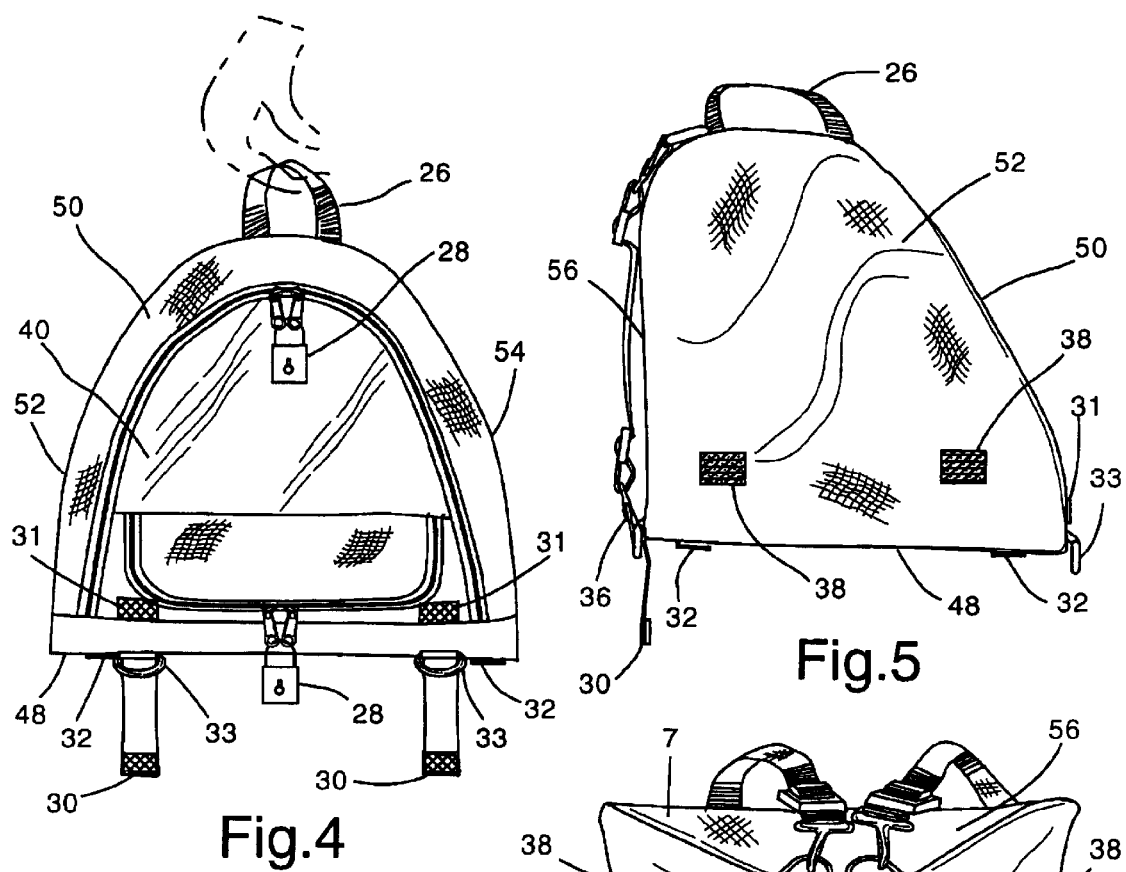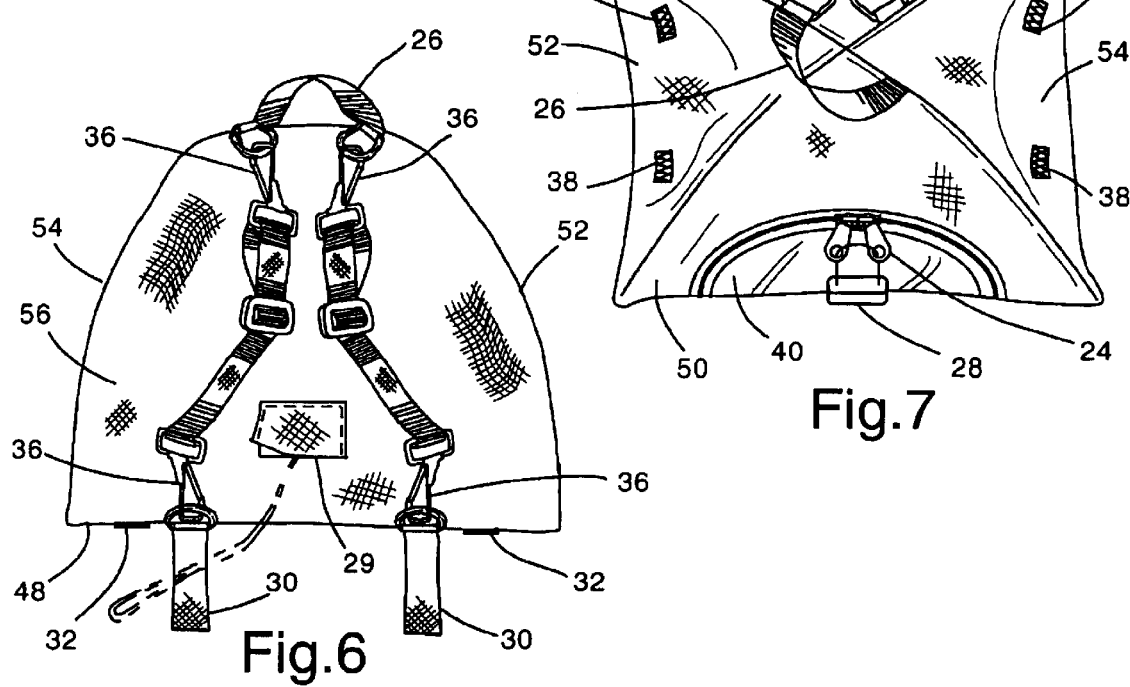

POP-UP ELECTRONIC EQUIPMENT ENCLOSURE

CROSS-REFERENCE TO RELATED APPLICATIONS

This application is a continuation-in-part of U.S. application Ser. No. 09/876,456, "Pop-Up Electronic Equipment Enclosure" filed on Jun. 6, 2001 now abandoned that is incorporated by reference. This application is also a continuation-in-part of PCT application PCT/US02/16916 (published as WO 02/098763) "Pop-Up Electronic Equipment Enclosure" filed on May 30, 2002 that is incorporated by reference. PCT application PCT/US02/16916 (WO 02/098763) is a continuation-in-part of U.S. application Ser. No. 09/876,456 "Pop-Up Electronic Equipment Enclosure" filed on Jun. 6, 2001.

STATEMENT REGARDING FEDERALLY SPONSORED RESEARCH AND DEVELOPMENT

Not Applicable.

REFERENCE TO A MICROFICHE APPENDIX

Not Applicable.

BACKGROUND OF THE INVENTION

1. Field of the Invention

This invention relates to a collapsible, lightweight, portable electronic equipment enclosure or container, specifically to an enclosure for table-top or in-lap use capable of providing ease of access to the equipment, equipment protection, display visibility and privacy while the equipment is in use, security when the user is away from the equipment, and equipment portability and protection when transporting the equipment.

2. Description of Related Art

Portable electronic equipment, especially the portable computer, is widely used in many environments in addition to the home or office. Using such equipment in public places indoors and outdoors and on transportation vehicles such as airplanes, trains, buses, vans, presents a number of issues. These issues involve convenience of equipment transport; privacy of the information displayed on the portable equipment; equipment security if left unattended; equipment protection from hazards such as direct sunlight, wind-blown debris, air-born dust, and moisture; and visibility of the equipment display in sunlight or in very brightly lit indoor areas. Using portable electronic equipment in industrial environments can also present equipment protection issues. In industrial environments portable electronic equipment may be used to supplement or back-up installed monitoring and test equipment, or for special calculations, measurements, or tests of equipment and process variables, or for control of process variables.

Currently available cases or covers for portable electronic equipment primarily provide protection during transport of the equipment and storage for accessories or office supplies. Once the equipment is in use the sensitive portions of the equipment are open to the environment and subject to dust, dirt, and moisture intrusion; observation by the casual passer-by; and poor visibility of the display in sunlight or brightly lit indoor areas. U.S. Pat. No. 6,149,001 (Akins) shows such a case. Attempts to address these issues have resulted in carrying cases that address only one or two of these issues. An example is U.S. Pat. No. 5,325,970 (Dillon) that addresses visibility of the display in bright light. Another example is U.S. Pat. No. 5,400,903 (Cooley), which primarily addresses equipment protection and privacy, although it additionally addresses the use of glare reducing coatings to assist in display visibility in sunlight, a less effective solution than simply providing shade for the display. These cases have the undesirable property of requiring the user to carry the substantial additional weight of the case when transporting the equipment. These cases also present their own storage problem when it is desired to use the electronic equipment without the case, such as when the user is home or in the office. Since the case is rigid and of substantial size, it presents a storage problem, taking up valuable space. These cases also are limited to use with a laptop computer or similarly configured electronic equipment. They could not easily be used with other electronic equipment, such as portable industrial measurement and test equipment, or a portable television.

Collapsible hoods have been proposed to address the issues of visibility of the portable electronic equipment display in sunlight or brightly lit areas and privacy in pubic areas. U.S. Pat. No. 5,988,823 (Wong) describes such a hood. Such hoods do not provide total enclosure of the equipment and thus provide little equipment environmental hazard protection or security when the equipment is unattended.

Thus there is a need for a portable electronic equipment enclosure that can be carried in multiple ways making transport easier, is easily stored, yet provides privacy of the information on the equipment display, gives security to the equipment when unattended, protection to the equipment from environment hazards, provides clear visibility of the display even in bright sunlight, and is light in weight.

SUMMARY OF THE INVENTION

This invention is a collapsible lightweight electronic equipment enclosure for tabletop or in-lap use providing ease of equipment access, equipment protection, display visibility, and privacy while the equipment is in use, security, and portability and equipment protection when transporting the equipment. It has application both to consumers using portable computing and entertainment equipment and to industrial users of electronic testing and inspection equipment; particularly equipment that is portable computer based, or is of similar size and weight.

The collapsible equipment enclosure has a tension frame with flexible struts. The struts are resiliently bent into a conic shape arc and positioned to cross each other at the apex of their respective arcs with the ends of the struts positioned in the down direction. A flexible sheeting bottom portion forms a rectangular periphery with four corners, an inside surface, and an outside surface; and an opaque flexible sheeting upper portion, with an opening, is joined to and contiguous to the bottom portion at the bottom periphery. The sheeting upper portion forms a conic dome shape with a substantially rectangular shape forming a front, back, left, and right sides at the attachment to the bottom.

The tension frame provides a tension force against the sheeting inner surface that maintains the sheeting substantially in the conic dome shape. The frame struts may be moved relative to each other by a force applied external to the enclosure. This permits folding the sheeting upper portion sides and bottom portion to a substantially flat position for storage without manipulation of the frame struts internal to the enclosure, while the frame struts continue to maintain tension on the sheeting. When the force applied external to the enclosure is removed, the enclosure unfolds substantially to the original shape by the tension force of the struts, and is ready for use. The opening in the sheeting upper portion allows entry and positioning of the tension frame and the equipment.

OBJECTS AND ADVANTAGES

Several objects and advantages of this invention are that it solves a multiplicity of problems with using electronic equipment in natural or harsh environments, or in a transportation vehicle.

Specifically, one object of the invention is to provide enhanced visibility of electronic equipment displays when used in locations that are in sunlight or have bright artificial light. A computer display can be difficult to see in a brightly lit environment as the bright light overwhelms the luminescence of the display. The pop-up equipment enclosure overcomes this problem by providing a dark, shaded location for the equipment where the luminescence of the display may be viewed against the dark interior of the enclosure A second object of the invention is to protect electronic equipment from weather or hazards of a harsh environment. The pop-up equipment enclosure solves this problem by surrounding the equipment with sheeting as desired. The sheeting is chosen with properties to prevent the anticipated environmental hazard from penetrating into the enclosure. The equipment is thus in a hazard-free environment.

A third object of the invention is to provide portability of the enclosure with the equipment inside. The pop-up equipment enclosure is lightweight due to its construction. This enhances portability. The enclosure further enhances portability by providing, as desired, a carry handle, straps to enable carrying as a backpack, and equipment support within the enclosure. The enclosure is designed to fit snugly around and transport an electronic device while in the collapsed position. However, the resilience of the bent struts maintains tension against the sheeting of the enclosure, give the enclosure structural stability. A portable electronic device may be transported inside the open-position enclosure while being carried by the handle, similar to carrying a birdcage.

A fourth object of the invention is to take minimal storage space when not in use. The pop-up equipment enclosure provides this by its ability to collapse almost flat. Storage of the collapsed enclosure takes minimal space. Straps with fasteners of velcro patches or mechanical fasteners secure the bottom of the unit in the folded position, and velcro patches secure the sides of the unit in the folded position, thus preventing the collapsed enclosure from opening when stored flat and empty, or when collapsed around an enclosed electronic device.

A fifth object of the invention is to restrict access to the electronic equipment display by a casual observer. The pop-up equipment enclosure provides this by being constructed of opaque sheeting with a viewing window that can be shielded by the user's body to preclude casual observers from observing the display. In addition, the glare guard inside the unit further restricts unwanted viewing by blocking the lower part of the equipment display from all but the user's eyes.

BRIEF DESCRIPTION OF THE SEVERAL VIEWS OF THE DRAWINGS

A more complete understanding of the invention can be obtained by considering the detailed description of the invention in conjunction with the accompanying drawings, in which:

FIG. 1 is a perspective view of the pop-up equipment enclosure with the opening closure in the open position, thus illustrating the internal arrangement of the enclosure in a preferred embodiment. This embodiment provides the ability to manipulate equipment such as a portable or laptop computer while maintaining environmental protection.

FIG. 2 is a perspective view of a cutaway of the pop-up equipment enclosure in the open position illustrating the arrangement of the independent struts in relation to the flexible sheeting.

FIG. 3 is a perspective view of a cutaway of the pop-up equipment enclosure in the collapsed position illustrating the arrangement of the independent struts in relation to the flexible sheeting. This collapsed position is used for storage, or for carrying as a briefcase, or for use as a backpack.

FIG. 4 illustrates the front view of the pop-up equipment enclosure. This view illustrates the parts of the enclosure.

FIG. 5 is a side view of the pop-up equipment enclosure showing an embodiment with a handle and with straps for carrying the enclosure as a backpack.

FIG. 6 is a back view of the pop-up equipment enclosure illustrating the parts of the enclosure in an embodiment with a handle, with straps for carrying the enclosure as a backpack, and with a cable entry to permit electronic or security cables to penetrate the enclosure.

FIG. 7 is a top view of the pop-up equipment enclosure illustrating the parts of the enclosure in the preferred embodiment.

REFERENCE NUMERALS IN DRAWINGS

Figures 8, 9:
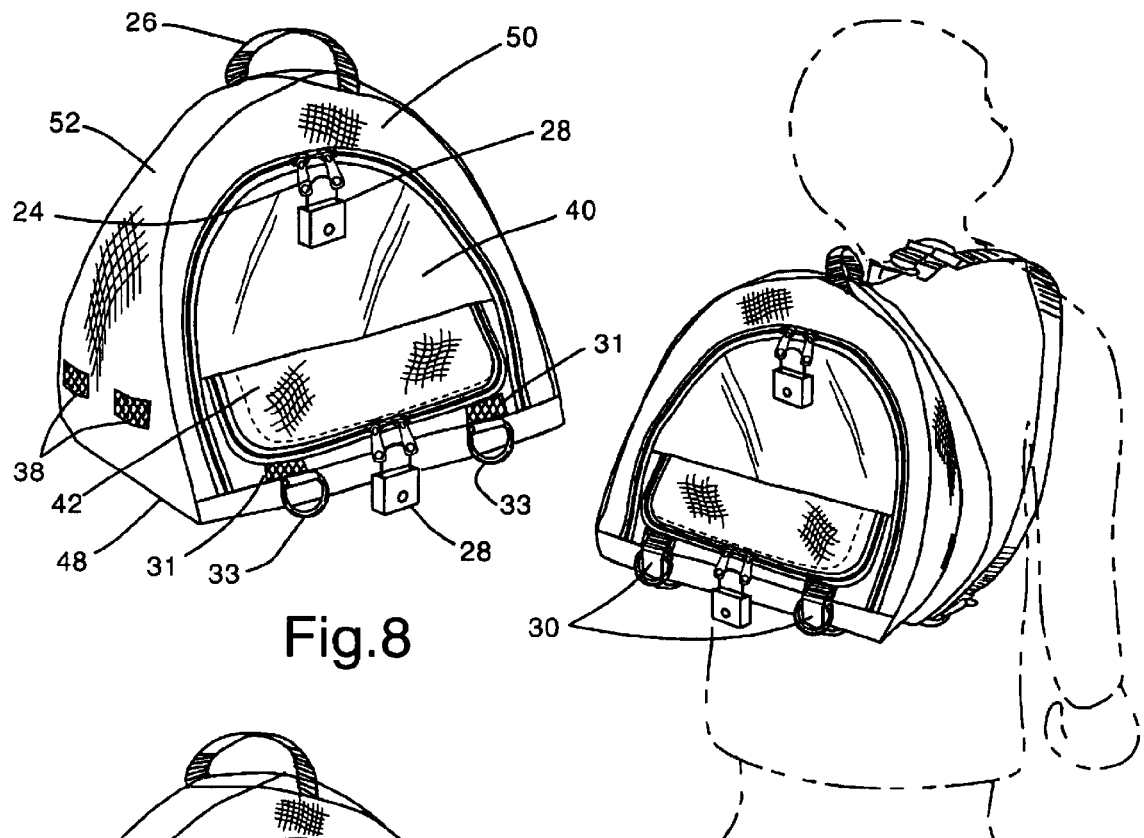
FIG. 8 is a perspective view of the pop-up equipment enclosure preferred embodiment with the opening closure in the closed position.
FIG. 9 is a perspective view illustrating the pop-up equipment enclosure preferred embodiment in the collapsed position being used as a means of transporting the enclosure and contained equipment as a backpack.

20. First strut
22. Second strut

24. Opening closure
26. Handle
28. Lock attachment points
29. Cable entry
30. Collapsed position retainer straps
31. Collapsed position retainer strap attachment points
32. Tabletop attachment point
33. Tabletop attachment ring
34. Equipment transport belt
36. Backpack strap attachments
38. Side collapsed position retainer
40. Transparent viewing window
42. Hand entry
44. Storage
46. Glare guard
48. Flexible sheeting bottom portion
50. Flexible sheeting front piece
52. Flexible sheeting left side piece
54. Flexible sheeting right side piece
56. Flexible sheeting back piece
60. Strut segment
62. Strut connector
64. Attachment loop
66 Inflatable strut
68 Inflatable strut fill connection
70 Strut Attachment Boot

DETAILED DESCRIPTION OF THE INVENTION

Preferred Embodiment

FIG. 1 shows the preferred embodiment of the pop-up equipment enclosure. In the preferred embodiment, the enclosure is equipped to contain and operate a portable (laptop) computer. The sheeting shown is an opaque lightweight or waterproof fabric. Portions of the sheeting (example the back piece and front piece) may be multi-layered to contain protective padding between the layers. The sheeting is composed of a rectangular bottom portion (48), and an upper portion substantially in a conic section dome shape. The upper dome portion consists of two side pieces (52) (54), a front piece (50) and a back piece (56). Some pieces of the upper portion and the bottom portion sheeting may be cut from a single piece of sheeting as desired to reduce the number of joints. Sheeting portions and pieces are attached by sewing the joints. Alternately an adhesive joining method, or a combination of methods as will provide a flexible and durable joint may be used. The exterior color of the sheeting may be varied to suit the desires and needs of the user. Black is the preferred color of the interior to provide contrast with the equipment display.

A collapsible tension frame of two independent crossed struts (20) (22) supports the sheeting as shown in FIG. 2. The struts are substantially straight, 3/16-inch fiberglass rods, but other materials, dimensions and cross-sections may be used to provide the desired tension on the sheeting. The strut length is sized to maintain the enclosure sheeting under a tension when the struts are bent into a conic arc and positioned within the sheeting. A conic arc is one that approximates a mathematical conic section, such as a hyperbola, a parabola or a circular section. Each strut is positioned to tension at opposing corners of the enclosure sheeting. The corners being formed by the joint of the rectangular bottom sheeting portion and the front, left side, back, and right side sheeting pieces. The sheeting portions are shaped so the corners of the enclosure follow the conic arc of the struts. The strut ends are coated to provide a soft resilient end or are equipped with separate tips with rounded ends so there are no sharp edges in contact with the sheeting.

The position of the struts in the sheeting corners permits the enclosure to be easily collapsed front-to-back into the position shown in FIG. 3. Solely by exerting a force on the front of the enclosure to move the struts at both sides of the enclosure towards the back collapses the enclosure. No entry into the interior of the enclosure is needed, nor is any disassembly of any component required. In the collapsing process, shown in FIG. 3, the sheeting sides and bottom fold and the struts come close together, but are separated by the folded side sheeting. The collapsed enclosure will return to its original shape, in other words pop-up, unless restrained in the collapsed condition. The tension of the struts on the enclosure sheeting provides the pop-up motion.

Provision is made to retain the enclosure in the collapsed position for storage and when transporting the enclosure. FIG. 5 shows the collapsed position retainers (38) on the side sheeting, which may be velcro patches, or other easily engaged fastening device. These retainers maintain the enclosure sides in the collapsed position when desired. Similarly collapsed position retainer straps (30) are attached at the rear of the enclosure bottom as shown on FIGS. 4, 5, 6 and 9. These may have velcro patches or other easily engaged fastening device near the end of the straps. The fastening devices secure these straps to matching fastening devices on the lower front panel of the enclosure when the enclosure is in the collapsed position. Fastening these straps retains the enclosure bottom in the collapsed position, and also provides support for equipment carried in the collapsed enclosure.

FIG. 1 shows an opening flap with an opening closure (24) in the open position in the front piece (50) of the sheeting. The opening allows for assembly of the struts and for equipment insertion or removal. This opening incorporates most of the area of the sheeting front piece as shown in FIG. 1, and is sized to allow for installation of the struts (20) (22) and for equipment installation and removal. The opening closure (24) is a zipper or other sliding tab closure device. It is shown in the closed position on FIG. 8.

FIG. 1 also shows the sheeting back piece (56) with provision on the interior side for storage (44) of computer accessories, such as earphones or data storage disks. An equipment transport belt (34) is also provided to give means to secure the enclosed equipment to the sheeting back piece (56) when the enclosure is collapsed for transport as a backpack or briefcase. This belt is positioned around the enclosed equipment to keep it against the sheeting back piece during transport.

The sheeting front piece (50) opening closure (24) is shown in FIG. 8 with dual opening closure operating mechanisms to provide a means to apply a lock at these attachment points (28). This feature can also be provided with a single operating mechanism and a separate fixed ring for lock attachment in proximity to the closed position of the opening closure operating mechanism.

A flexible transparent viewing window (40) is provided in the upper area of the opening flap as shown in FIGS. 1, 4, and 8. The combination of enclosing the equipment in opaque sheeting and providing a single transparent viewing window provides a benefit of enhancing privacy in the use of the enclosed equipment. Visibility of the equipment display is restricted to the user and persons directly behind the user.

Figures 10, 11:
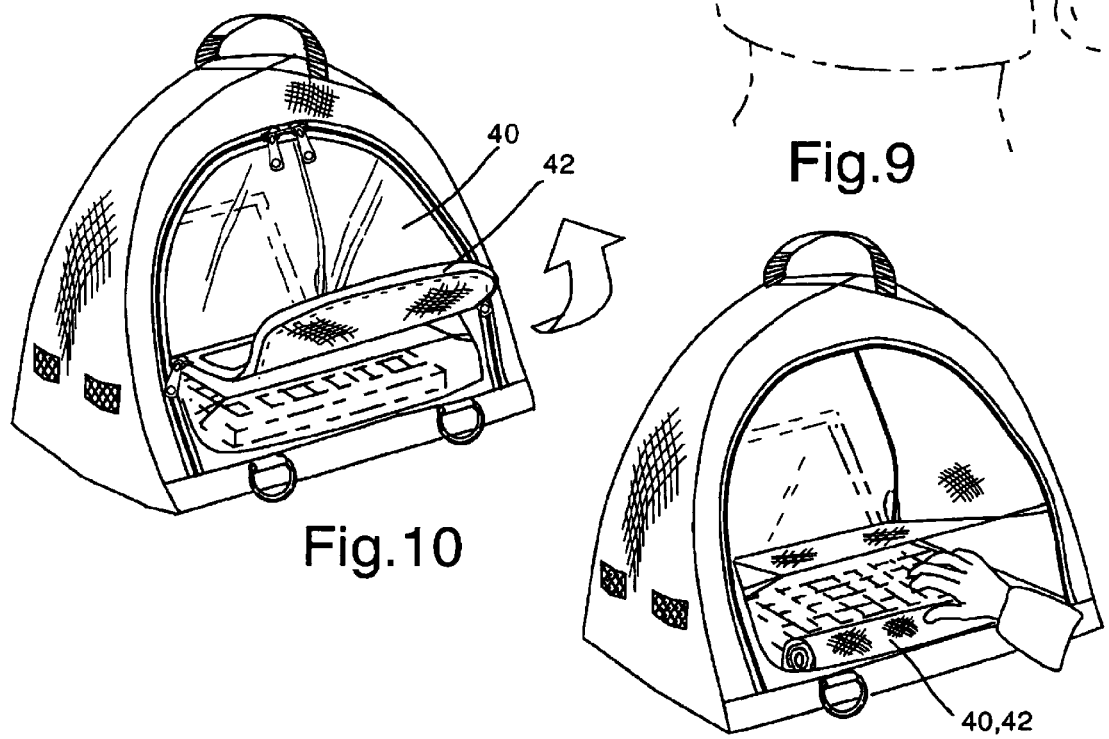
FIG. 10 is a perspective view illustrating the pop-up equipment enclosure preferred embodiment being used to manipulate a laptop computer contained in the enclosure.
FIG. 11 is a perspective view illustrating the pop-up equipment enclosure preferred embodiment with the opening flap open and rolled up to provide a wrist rest for use of a laptop computer keyboard.

FIGS. 8, 10, and 11 show a separate hand entry (42) opening is provided in the lower area of the opening flap for manipulation of the computer while observing the computer display and keyboard through the transparent window. The zipper or other sliding tab closure device on the hand entry also has dual operating mechanisms as shown on FIGS. 4 and 8 to provide lock attachment points (28). This feature can also be provided with a separate fixed ring for lock attachment in proximity to the closed position of the closure device operating mechanism.

The transparent viewing window (40) and the hand entry (42) together allow safely using the contained computer or other electronic device in rainy or other inclement weather, or harsh environments, such as at the beach, without any unwanted materials such as moisture, dust, or debris entering the enclosure.

A great majority of the time the enclosure will be utilized open fronted; that is with the opening closure open so the opening flap, including the viewing window and the hand entry, is unzipped so as to be completely open on both sides of the unit. The opening flap can then be rolled tightly away from the user and tucked snugly in front of the laptop computer or other contained device and used as a hand rest while manipulating the device keyboard. FIG. 11 illustrates this use.

The glare guard (46) is shown on FIGS. 1, 2 and 3. This is a movable opaque rectangle of sheeting suspended from the struts by loops of elastic so its position may be adjusted. The glare guard installed internal to the enclosure provides a method to preclude direct lighting on the hands, arms, or trunk from reflecting onto the display and thereby interfering with viewing the display. Such a reflection can occur when overhead light, such as sunlight, comes through the transparent viewing window, or the open front opening, and impinges on the hands and keyboard. The resulting reflection of light onto the screen can interfere with the user's view of the display. The glare guard shades the hands and keyboard and provides a light barrier precluding this interference with the user's view of the display.

The glare guard is adjusted by sliding the elastic loops along the struts, thus moving its suspension points on the struts. The case of the enclosed computer is first opened to the operating position, which places the display at approximately a right angle with the keyboard. The edge of the glare guard away from the user is positioned so it is at the corner of the computer case formed between the computer display and keyboard. The edge of the glare guard towards the user is then adjusted at an angle so the guard is viewed at its thinnest point, along its near edge. FIG. 2 illustrates the adjustment of the guard. With the guard properly adjusted, the user may view the entire display above the glare guard and view the keyboard below the glare guard.

FIG. 4 demonstrates carrying the pop-up equipment enclosure with the handle (26). The handle is attached to the upper portion of the enclosure at the joints between the sheeting side pieces (52) (54) and the front (50) and back (56) pieces as shown in FIG. 7. FIGS. 5, 6 and 7 show the backpack strap attachments (36) provided in the lower back joint of the enclosure and also provided in the upper back piece joints with the left and right side pieces. The strap attachments shown are common metal hooks with a spring closure to prevent accidental disconnection from the metal rings. Common quick disconnect plastic clips or other attachment device may be used instead of the metal rings and hooks for the attachment points. FIG. 9 demonstrates use of the left and right backpack straps in carrying the enclosure.

The cable entry (29) is shown on FIG. 6. This is a small opening in the sheeting back piece sized for the expected external cable connections which would pass through the opening. The opening may be covered by a flap as shown, or left open. This opening may be used to pass a security cable through the connection on the enclosed equipment. The security cable could then be safeguarded with a lock so as to prevent unauthorized taking of the equipment. Placing locks on the lock attachment points (28) of the enclosure as shown in FIG. 4 also inhibits tampering. The cable entry also may pass data communication cables and/or external power cables to the enclosed equipment. An example of such a use may be to charge the battery on a laptop computer or to operate it on external power. Another use may be for data communications cables to pass between adjacent enclosures one of which houses signal processing equipment and the second of which houses a computer recording and displaying the data.

FIGS. 5 and 7 show the side collapsed position retainers (38) positioned on the sheeting left and right side pieces. These serve to retain the enclosure in the collapsed position when desired, such as when the enclosure is transported as a backpack. The retainers are fasteners (example velcro or plastic or metal snaps) attached to the sheeting side pieces near the front and back of the side piece. With the enclosure in the collapsed position these side collapsed position retainers maintain the sheeting side pieces folded in the collapsed position.

There are fasteners (example velcro) attached near the corners of the pop-top enclosure bottom sheeting (32) for use as tabletop attachment points, as shown in FIGS. 4, 5, and 6. These attachment points can be aligned with an adhesive fastener (example velcro) applied to the tabletop at locations to mate with the enclosure attachment points. As an alternate anchoring method, the fasteners may be two metal or plastic rings (33) attached at the joint of the bottom sheeting and front sheeting piece. These front rings in conjunction with the existing backpack strap attachment rings on the lower back of the enclosure will enable a user to tie the unit down onto a work surface if the velcro fasteners are not workable. The enclosure and its contents are then protected against movement caused by wind, turbulence in an airplane, pitching in a boat, or seismic events.

Additional Embodiments

The pop-up equipment enclosure may be used to protect a variety of electronic equipment in a multitude of environments. Depending on the size of the equipment to be enclosed, an additional embodiment is to vary the dimensions of the enclosure to accommodate the desired equipment.

Depending on the environment to be encountered, the sheeting material may be varied in different embodiments. The sheeting material is selected with properties to provide a lightweight enclosure, the desired environmental protection, and the desired color.

The enclosure may also be used for electronic equipment that performs a monitoring function, thus requiring only periodic manipulation that can be accomplished by opening the front panel. This embodiment of the enclosure would not require a hand entry. The elimination of the hand entry also makes the use of the glare guard unnecessary, further reducing the cost to manufacture.

Another embodiment would be to eliminate not only the hand entry and glare guard but also the transparent viewing window. This would require opening the sheeting front piece opening flap to observe the status of the equipment, and to manipulate the equipment. This embodiment would be less expensive to manufacture. This embodiment still allows the front panel access flap to be rolled into the interior of the enclosure and used as a wrist rest when manipulating the equipment.

The need for security, privacy, or complete environmental protection may not be an issue for some users and another even less expensive embodiment would be to eliminate the opening closure on the front of the unit and simply have the sheeting surround the enclosure interior with an unclosed opening.

Removable backpack straps may not be desirable for some users, and an enclosure that had straps permanently joined at the enclosure joint is another embodiment.

Alternately, backpack straps may not be desirable for other users and an enclosure that did not accommodate use of the straps is another embodiment.

The use of the tabletop attachment points may not be needed for some users of the enclosure and this feature could be eliminated as another embodiment. The use of the side collapsed position retainers is sufficient to retain the enclosure in the collapsed position for storage.

Figure 12:
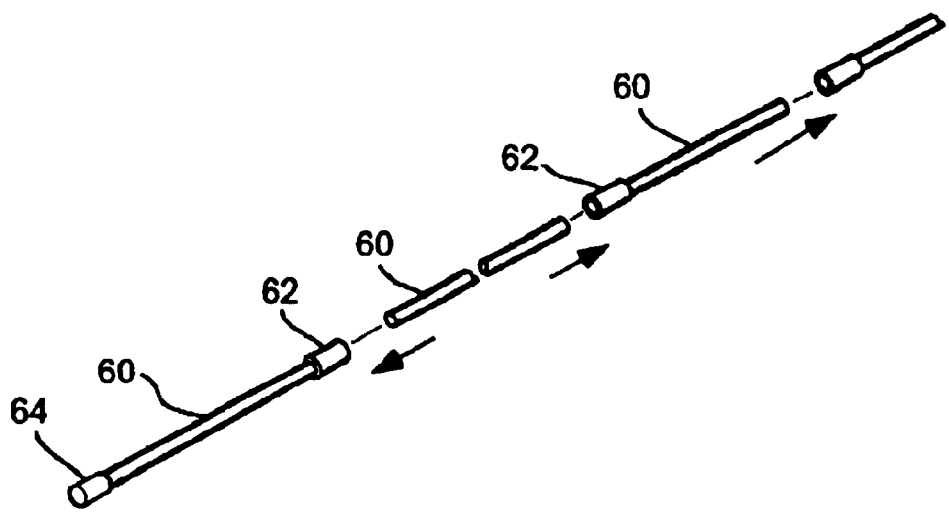
FIG. 12 is a perspective view of a portion of a segmented strut. This illustrates the construction and assembly of segmented struts in an embodiment of the pop-up equipment enclosure.
Figure 13:
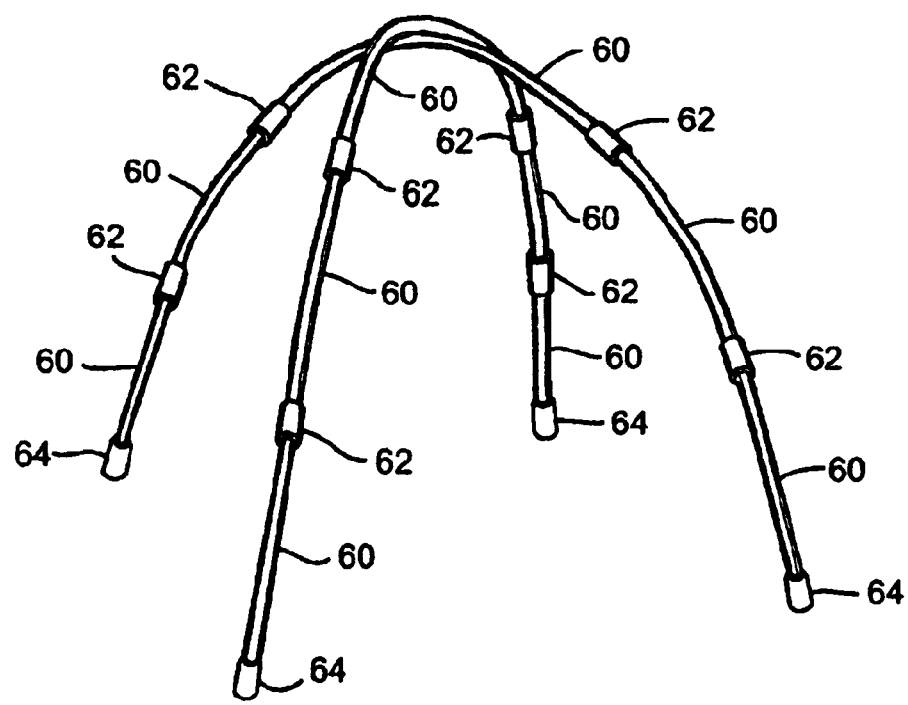
FIG. 13 is a perspective view of two assembled segmented struts in the position they would be inside the enclosure. This illustrates the use of segmented struts for the frame of the pop-up equipment enclosure.

The struts may not be constructed of a continuous piece of fiberglass, but instead constructed of several strut segments that are joined by strut connectors to form a single complete strut as illustrated in FIGS. 12 and 13. In this embodiment the strut segments and disassembled enclosure may be compactly stored or packaged in an cylindrical shape for shipment or transport by placing the disassembled strut segments and connectors in the enclosure sheeting and rolling the sheeting around the segments and connectors to form a cylindrical shape. The rolled enclosure cylinder may be stored in a separate cylindrical or rectangular container, or maintained in the cylindrical configuration by a strap, elastic, or a tie. Assembly is by inserting one end of the strut segment (60) into the opening in the strut connector (62), as shown in FIG. 12, then inserting an end of a second strut segment in the other end of the strut connector. The other end of the second strut connector is then inserted into the opening in the second strut connector and this continues until the strut segments are joined to form a complete strut of the desired length as illustrated in FIG. 13. The completed strut ends are coated or equipped with a tip (64) as illustrated in FIG. 13.

Figure 14:
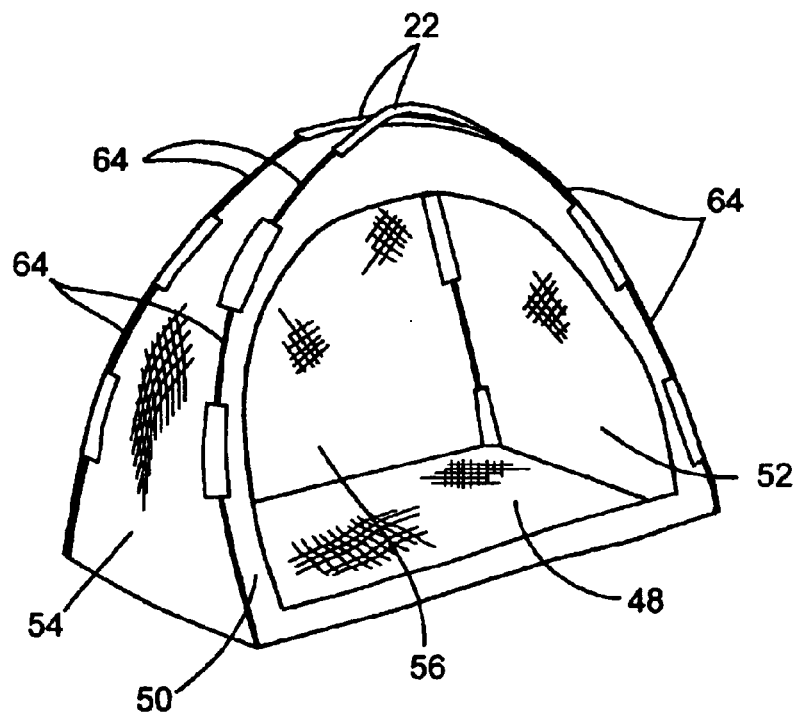
FIG. 14 is a perspective view of the pop-up equipment enclosure in an embodiment with the struts assembled external to the enclosure. This figure also shows an embodiment without a closure for the opening.

The struts may be externally attached to the sheeting in another embodiment. In this embodiment the sheeting outside surface has attachment loops spaced periodically along the enclosure corners from the bottom to the top, or an attachment pocket with an insertion slot near the top of the enclosure. The struts then provide tension on the sheeting through the attachment loops or pockets. The attachment loops may be separate pieces attached to the corners of the enclosure sheeting, or may be a part of the sheeting with holes that are arranged along the corner of the sheeting to permit threading the strut into and out of the sheeting at periodic intervals, as shown in FIG. 14. The external struts may be continuous, or segmented. The enclosure with the external frame collapses similar to the internal frame, and similarly will pop-up to the un-collapsed configuration.

Figure 15:
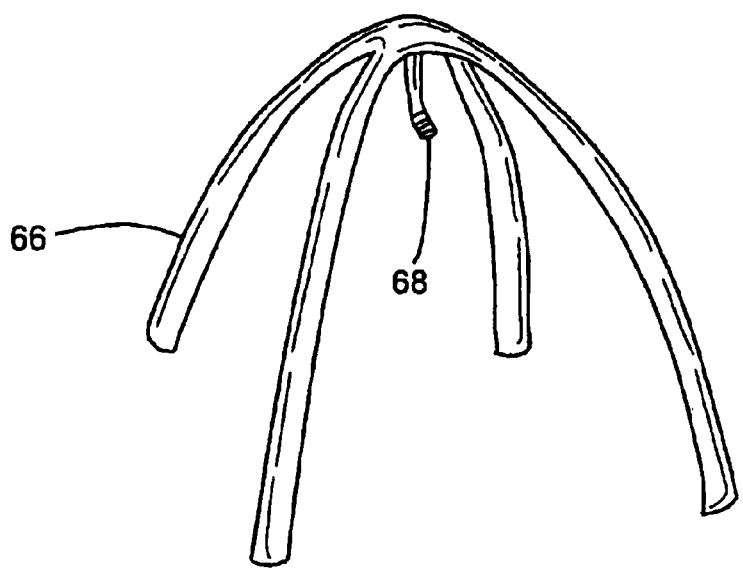
FIG. 15 is a perspective view of an embodiment with a frame of an inflatable strut assembly in the position it would be inside the enclosure. This shows the inflatable strut assembly in the inflated condition.
Figure 16:
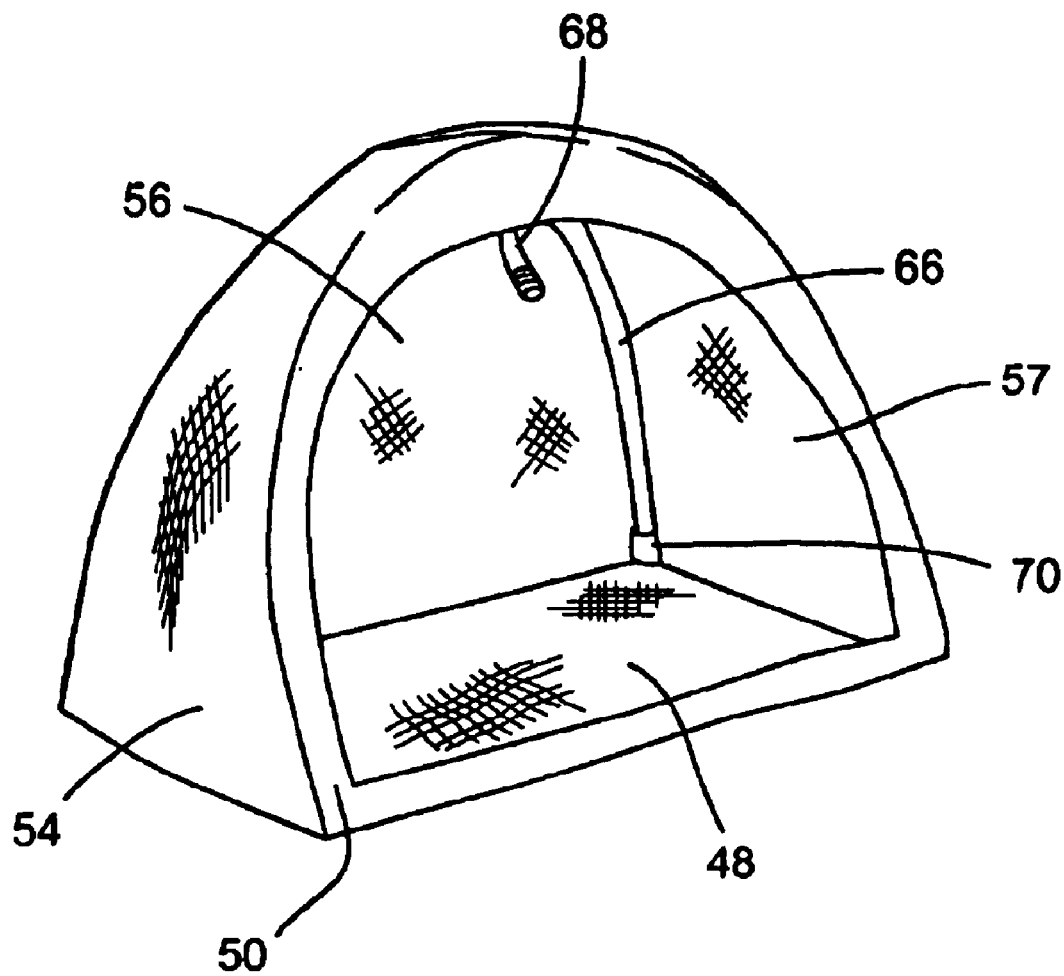
FIG. 16 is a perspective view of an inflatable strut assembly installed in an enclosure in the inflated condition. This figure also shows an embodiment without a closure for the opening.

The struts may be constructed of inflatable plastic or rubber tubing arranged as independent crossed struts in one embodiment, as shown in FIGS. 2 and 3, or may be an embodiment oft singular inflatable strut structure independent of the enclosure sheeting as shown in FIG. 15. The inflatable strut structure has four legs as shown, in the shape of a conic dome arc, and sized to maintain tension on the enclosure sheeting. The bottom end of each leg is in contact with a strut attachment boot attached to the interior corners of the enclosure as shown in FIG. 16. The legs have an internal interconnecting attachment at the top to permit a single strut fill connection to supply air to inflate all the legs. Inflatable struts (66) of this singular construction may use an external attachment to the enclosure similar to that used for the external solid strut, shown in FIG. 14 or may be installed internal to the enclosure as shown in FIG. 16. Internal inflatable tubes may be inflated through a fill connection (68) through an additional opening in the enclosure, or may be inflated at a location accessible through the existing opening as is shown in FIG. 16. The inflatable strut is filled with air to support the enclosure. The enclosure may be folded nearly flat with the struts inflated by exerting external force on the enclosure to fold it flat, and it will pop-up to its original shape when the external force is removed. The air may also be exhausted to collapse the enclosure for storage. The collapsed enclosure using inflatable struts may then be rolled up into a cylindrical shape for storage. This storage configuration is similar to the embodiment with the segmented struts. The struts may be also be filled with air by a band pump, such as common bicycle pump, an air pump, including a battery operated air pump, or may be done by blowing air into the tubing. A valve (example a bicycle tube valve) or tubing with a crimp may be used to seal the air strut fill connection.

Operation

An operation of the pop-up equipment enclosure that is not previously described is the assembly and disassembly of the enclosure. The enclosure may be packaged disassembled to reduce shipping and packaging costs. Assembly requires laying the sheeting out flat and unzipping the sheeting front piece opening flap. The first strut is then bent into an arc and one end is positioned against the bottom of the enclosure in a back corner. The apex of the strut is then pressed to the top of the enclosure and the second end then positioned in the opposing front corner as shown in FIG. 2. The second strut is then similarly positioned in the remaining corners as shown in FIG. 2. If segmented struts are used, the strut segments must first be joined to form the two complete struts before assembly in the enclosure. Attachment of the backpack straps (if provided and detachable) to their attachment points is the only other assembly required. If external struts are used the struts are inserted into the attachment loops rather than the inside of the enclosure. Disassembly is the reverse of assembly.

If the struts are inflatable, inflating the strut assembles the enclosure. Disassembly is the reverse, deflating the strut.

I claim:

1. A collapsible equipment enclosure comprising:
   a. a tension frame comprising an independent flexible first strut with a first end and a second end and an independent flexible second strut with a first end and a second end, the first strut resiliently bent into a conic shape arc and the second strut resiliently bent into a conic shape arc and the first strut and the second strut positioned to cross each other at the apex of their respective arcs with the ends of the struts positioned in the down direction;
   b. a flexible sheeting bottom portion configured to substantially form a rectangular periphery with four corners, an inside surface, and an outside surface;
   c. a flexible, substantially opaque, sheeting upper portion with an inside surface and an outside surface, including at least one opening, the sheeting upper portion joined to and contiguous to the bottom portion at the bottom periphery such that the sheeting bottom portion inside surface and the sheeting upper portion inside surface surround the enclosure interior with the sheeting upper portion configured to substantially form a conic dome shape with a substantially rectangular shape forming a front, back, left, and right sides at the attachment to the bottom;
   d. the tension frame arranged within the sheeting upper portion with the ends positioned on the inside surface of the sheeting bottom portion at the four corners, the resilience of the first and second struts providing a tension force against the sheeting inner surface which maintains the sheeting substantially in the conic dome shape with four corners and such that the frame struts may be moved relative to each other solely by force applied external to the enclosure to permit folding the sheeting upper portion sides and bottom portion to a substantially flat position wherein the assembled enclosure may be shipped or stored in a narrow space, while the frame struts maintain tension on the sheeting to permit unfolding the enclosure substantially to the original shape solely by the tension force of the struts when the force applied external to the enclosure is removed wherein the assembled enclosure is ready for use; and e. the opening in the sheeting upper portion front side is arranged to allow entry and positioning of the tension frame and the equipment.

2. The collapsible equipment enclosure of claim 1 further comprising the tension frame is arranged external to the sheeting and inserted through attachment loops spaced periodically on the sheeting so as to provide tension to the sheeting through the external attachment loops.

3. The collapsible equipment enclosure of claim 1 further comprising the independent first strut and independent second strut are comprised of a multitude of strut segments and a multitude of strut connectors:

a. the strut segments having a first end and a second end;

b. the strut connectors having a cylindrical body with a first end and a second end, the first end arranged with an opening and the second end arranged with an opening;

c. the strut segment first end arranged to insert into a first end strut connector opening and the second end strut connector arranged to permit insertion of a second strut segment second end, such that the insertion of strut segments into strut connector openings may be repeated until a strut of the desired length is obtained.

4. The collapsible equipment enclosure of claim 1 further comprising the tension frame is comprised of an independent inflatable strut structure with a first leg with a bottom end and an attachment end, a second leg with a bottom end and an attachment end, a third leg with a bottom end and an attachment end, a fourth leg with a bottom end and an attachment end, arranged with the leg attachment ends internally connected such that a single fill connection provides inflation of the tension frame, and with the ends of the strut structure positioned in the down direction.

5. The collapsible equipment enclosure of claim 1 further comprising the independent first strut and independent second strut are constructed of inflatable tubing.

6. The collapsible equipment enclosure of claim 1 further comprising:

a. a handle attached to the sheeting upper portion arranged to permit carrying the enclosure;

b. a flexible sheeting flap removably covering the sheeting upper portion front opening, the flexible sheeting flap positioned by an opening closure device arranged to permit applying a lock to secure the flap in the closed position;

c. a equipment transport belt attached to the sheeting upper portion inside surface configured opposite the sheeting upper portion opening and arranged to retain the equipment against the sheeting inside surface when transporting the enclosure;

d. a plurality of attachment devices arranged to detachably install backpack straps to the enclosure;

e. a plurality of collapsed position retainer straps attached to the sheeting bottom portion rear outside surface each arranged with attachment devices wherein the retainer straps engage attachment devices on the sheeting upper portion front; and f. a side collapsed position retainer comprising a plurality of attachment devices arranged to maintain the sheeting left and right sides in a folded position.

7. The collapsible equipment enclosure of claim 1 further comprising:

a. a transparent viewing window comprising a transparent portion of the flexible sheeting flap;

b. a hand entry comprising a flexible flap arranged with a straight upper edge attached to the lower portion of the flexible sheeting flap covering having a substantially curved lower and left and right side edges forming an inverted U shape which is removably attached to the flexible sheeting flap covering and arranged to allow entry of the hands into the enclosure; and c. a glare guard comprising a flexible sheeting piece configured to form a rectangular periphery with four corners, an inside surface, and an outside surface flexibly and adjustably mounted at the four corners to the tension frame struts wherein the glare guard is adjustably mounted to allow viewing of the equipment in the enclosure while shielding the portion of the equipment above the glare guard from light reflected from the portion of the equipment or the hands or other body part positioned below the glare guard.

8. A pop-up backpack configured to operatively contain a portable electronic device and protect the device from environmental hazards comprising:

a. flexible sheeting with an exterior side and an interior side arranged as a conic section dome portion and a rectangular bottom portion;

b. the rectangular bottom portion connected to the conic dome portion such that the backpack is configured with a front, rear, a left side, and right side;

c. a plurality of independent tension struts arranged to support the flexible sheeting such that the backpack may be collapsed to a flattened position by applying force to the exterior side of the backpack sheeting such that the assembled backpack may be shipped or stored in a narrow container, and wherein the backpack pops-up to the original configuration upon release of the force to the exterior side such that the assembled backpack is ready for use;

d. the sheeting conic section dome portion contains an opening arranged to permit assembly of the struts;

e. a plurality of fasteners attached to the exterior of the sheeting and arranged to permit attachment of at least two straps configured to allow a person to wear the backpack; and f. a flexible sheeting closure flap arranged to securely cover the conic section dome sheeting portion opening wherein the interior of the backpack is protected from the environment.

9. The pop-up backpack of claim 8 further comprising the first strut and second strut are arranged external to the sheeting and inserted through attachment loops spaced periodically on the sheeting so as to provide tension to the sheeting through the external attachment loops.

10. The pop-up backpack of claim 8 further comprising the independent first strut and independent second strut are comprised of a multitude of strut segments and a multitude of strut connectors;

a. the strut segments having a first end and a second end;

b. the strut connectors having a cylindrical body with a first end and a second end, the first end arranged with an opening and the second end arranged with an opening;

c. the strut segment first end arranged to insert into a first end strut connector opening and the second end strut connector arranged to permit insertion of a second strut segment second end, such that the insertion of strut segments into strut connector openings may be repeated until a strut of the desired length is obtained.

11. The pop-up backpack of claim 8 further comprising the tension struts are comprised of an independent inflatable strut structure with a first leg with a bottom end and an attachment end, a second leg with a bottom end and an attachment end, a third leg with a bottom end mid an attachment end, a fourth leg with a bottom end and an attachment end, arranged with the leg attachment ends internally connected such that a single fill connection provides inflation of the tension frame.

12. The pop-up backpack of claim 8 further comprising the independent first strut and independent second strut are constructed of inflatable tubing.

13. The pop-up backpack of claim 8 further comprising:

a. a plurality of collapsed position retainer straps attached at the exterior of the sheeting bottom rear side and arranged such that the straps may be removably attached to a plurality of collapsed position retainer strap attachment points on the exterior to maintain the backpack in the collapsed position;

b. a cable entry opening arranged opposing the conic section dome sheeting portion opening on the rear, wherein cables enter the enclosure for attachment to the device;

c. a flexible sheeting closure flap arranged to cover the cable entry opening;

d. a handle arranged on the exterior upper portion of the conic section dome sheeting portion whereby the enclosure and backpack may be carried by hand;

e. an equipment transport belt arranged in the interior of the flexible sheeting conic section dome portion whereby the electronic device may be retained against the flexible sheeting by the belt.

14. The pop-up backpack of claim 13 further comprising a plurality of fasteners attached to the sheeting bottom portion exterior and arranged to allow securing the backpack to a horizontal surface.

15. The pop-up backpack of claim 14 further comprising:

a. a transparent viewing window arranged in the upper portion of the sheeting conic section dome opening;

b. a hand opening arranged below the transparent viewing window wherein the device may be manipulated while observing the device in the transparent viewing window; and c. a glare guard adjustably mounted to the struts and arranged wherein it shades the display from light reflected from the hands; arms and trunk of the user manipulating the device through the band opening.

16. A laptop computer protective enclosure and backpack comprising:

a. a tension frame comprising an independent flexible first strut with a first end and a second end and an independent flexible second strut with a first end and a second end, the first strut resiliently bent into a conic shape arc and the second strut resiliently bent into a conic shape arc and the first strut and the second strut positioned to cross each other at the apex of their respective arcs with the ends of the struts positioned in the down direction;

b. a flexible sheeting bottom portion configured to substantially form a rectangular periphery with four cowers, an inside surface, and an outside surface;

c. a flexible, substantially opaque, sheeting upper portion with an inside surface and an outside surface, including at least one opening, the sheeting upper portion joined to and contiguous to the bottom portion at the bottom periphery such that the sheeting bottom portion inside surface and the sheeting upper portion inside surface completely surround the enclosure interior with the sheeting upper portion configured to substantially form a conic shape with a substantially rectangular shape forming a front, back, left, and right sides at the attachment to the bottom;

d. the tension frame is arranged within the sheeting upper portion with the ends positioned on the inside surface of the sheeting bottom portion at the four corners, the resilience of the first and second struts providing a tension force against the sheeting inner surface which maintains the sheeting substantially in the conic dome shape with four corners and such that the assembled frame struts may be moved relative to each other solely by force applied external to the enclosure to permit folding the sheeting upper portion sides and bottom portion to a substantially flat position while the frame struts maintain tension on the sheeting to permit the enclosure substantially to unfold to the original shape solely by the tension force of the struts when the force applied external to the enclosure is removed; and e. a plurality of attachment devices arranged to detachably install backpack straps to the enclosure.

17. A laptop computer protective enclosure and backpack as in claim 16 further comprising a plurality of collapsed position retainer straps attached to the sheeting rear outside surface each arranged with attachment devices wherein the retainer straps engage attachment devices on the sheeting front outside surface and are arranged to maintain the sheeting and the tension frame in a folded position.

18. A laptop computer protective enclosure and backpack as in claim 17 further comprising an equipment transport belt attached to the sheeting upper portion inside surface configured opposite the sheeting upper portion opening and arranged to retain the laptop computer against the sheeting inside surface when transporting the enclosure.

19. A laptop computer protective enclosure and backpack as in claim 18 further comprising:

a. the sheeting upper portion opening includes a transparent viewing window for viewing the enclosure interior;

b. a hand opening arranged below the transparent viewing window wherein the laptop computer may be manipulated while observing the computer in the transparent viewing window; and c. a glare guard adjustably mounted to the struts and arranged wherein it shades the display from light reflected from the hands, arms and trunk of the user manipulating the device through the hand opening.

20. A method of manufacturing a structure to protect a laptop computer from environmental hazard, and shield the user's view of the laptop computer display from the reflection of bright light on a laptop computer keys and the reflection of bright light on the user's hands, arms, and trunk comprising:

a. surrounding the laptop with a structure of opaque sheeting with an opening covered by a flap, and a viewing window;

b. orienting the opaque sheeting structure with the computer display shielded from the bright light and such that a user may insert the user's hands through the opening to manipulate the computer keys and view the computer display through the viewing window;

c. mounting an internal movable opaque rectangle of sheeting in an orientation that shields the keys and the user's bands from bright light entering through the viewing window and simultaneously allows viewing the display.

21. A method of transporting an electronic equipment item into a natural or harsh environment and operating the electronic equipment in the natural or harsh environment comprising:

a. placing the equipment item into an assembled pop-up electronic equipment enclosure;

b. securing the equipment item with the equipment transport belt;

c. closing the pop-up electronic equipment enclosure equipment enclosure opening closure thereby surrounding the equipment with sheeting separating it from the environment;

d. attaching backpack straps to the equipment enclosure;

e. collapsing the pop-up electronic equipment enclosure by force applied external to the enclosure to permit folding the sheeting upper portion sides and bottom portion to a substantially flat position;

f. fastening the collapsed position retainers to maintain the pop-up electronic equipment enclosure in the collapsed position;

g. transporting the pop-up electronic equipment enclosure on the back with the backpack straps to the natural or harsh environment;

h. placing the pop-up electronic equipment enclosure on the work surface;

i. releasing the collapsed position retainers thus allowing the pop-up electronic equipment enclosure to pop-up to the original shape;

j. opening the hand entry closure device;

k. placing the bands inside the pop-up electronic equipment enclosure through the band entry;

l. releasing the equipment transport belt;

m. placing the equipment item in the operational position inside the pop-up electronic equipment enclosure;

n. routing any cables required for manipulation of the equipment item through the cable entry;

o. manipulating the equipment item as desired.

22. The method according to claim 21 further comprising:

a. the step of placing the equipment item in the operational position includes opening a laptop computer to the operational position;

b. the step of manipulating the equipment includes viewing the laptop computer display in the enclosure through the transparent viewing window; and c. adjusting the enclosure glare guard position so the laptop display may be seen with the glare guard shading the hands and keyboard from external light.

* * * * *

UNITED STATES PATENT AND TRADEMARK OFFICE
CERTIFICATE OF CORRECTION

PATENT NO. : 6,772,883 B2
DATED : September 28, 2004
INVENTOR(S) : Kirk Lindamood It is certified that error appears in the above-identified patent and that said Letters Patent is hereby corrected as shown below:

Column 13,
Line 18, change "mid" to -- and --.

Column 14,
Line 8, change "cowers" to -- corners --.

Signed and Sealed this

Twenty-second Day of February, 2005

JON W. DUDAS
*Director of the United States Patent and Trademark Office*